Aug. 16, 1966  A. W. FARRALL  3,266,233
INERTIA PROPULSION DEVICE
Filed Sept. 4, 1964  2 Sheets-Sheet 1

INVENTOR.
Arthur W. Farrall
BY
Harness, Dickey & Pierce
ATTORNEYS

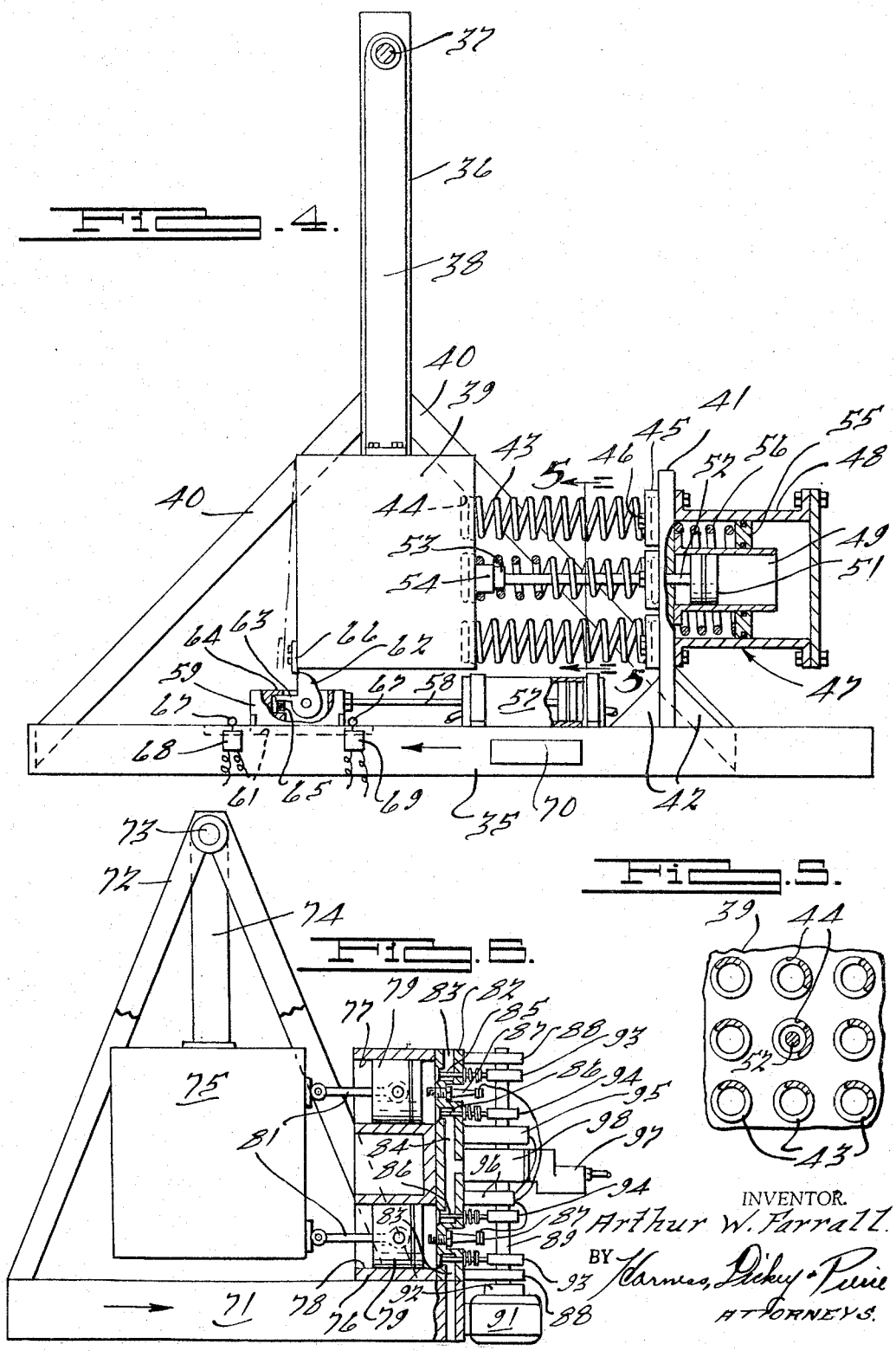

United States Patent Office 3,266,233
Patented August 16, 1966

3,266,233
INERTIA PROPULSION DEVICE
Arthur W. Farrall, 639 Collingwood Drive,
East Lansing, Mich.
Filed Sept. 4, 1964, Ser. No. 394,501
4 Claims. (Cl. 60—7)

This invention relates to propulsion devices, and particularly to a propulsion device which is energized by a reactive force.

Normally, propulsion devices react against the ground, water, air and the like, to produce work, motion to vehicles or otherwise expend the generated force. Thus an airplane or boat is moved by a propeller in a fluid medium while an automobile is propelled by the traction between the wheels and the ground.

In practicing the present invention, a repeated force is produced for moving, steering and/or stopping a body through the production of energy between an inertia member and the body which reacts directly with the member when the member is released and is substantially independent of a support. A simple form of the invention, by way of example, would embody a heavy pendulum connected to the body by springs in which energy is stored by compression or tension when the pendulum is moved from vertical position. The weight of the pendulum becomes a free body when released so that the energy in the spring can react between the pendulum and the body to produce a force in the body. In this manner an object may be urged in any direction through the use of the inertia force substantially independent of the support of the body. The repeated movement of the pendulum in the example above given, will continuously apply in increments of reactive force to the body which can be expended to do work such as move, change the direction of, retard or stop a vehicle or otherwise act thereupon substantially independent of the support thereof. While it is not intended that such a device is to supersede the driving means employed today for all types of vehicles, it has specific applications where a force requires only a small reactive medium. The amount of work capable of being performed by such a device depends upon the weight of the inertia member against which the reactive force is produced, the weight of the body and the velocity of acceleration of the inertia member to produce a sharp impulse of short duration to the body. The use of a plurality of pendulums, serially released, will produce a relatively smooth force in the direction of, or opposite to, the movement of the released pendulums following Newton Third law, to every action there is an equal and opposite reaction.

When we consider the storing of energy, for example, in springs between two bodies, no reaction can occur until one of the bodies is unsupported. When one of the bodies is unsupported, the energy stored in the spring can react between both bodies, the supporting body will have a force applied thereto in a direction opposite to that in which the energy is being expended relative to the unsupported body. If the energy in the spring between the two bodies is in tension, the release of one body to have it unsupported will cause the other body to be urged toward the unsupported body. Thus, if the pendulum above referred to had a stretched spring between it and the supported body, the supported body would be urged toward the pendulum as it is released to move toward the supported body. This reactive force to the inertia in the mass pendulum is entirely different from the force which would be exerted by the pendulum if it were released to swing toward and strike the supported body, as this would move the supported body in the direction of the pendulum swing. In the example above given, the reaction of the tensioned spring upon the release of the pendulum, moves the supported body toward the pendulum since the force to move the supported body is one in reaction relative to the weight of the supported body by the tension in the spring between the two bodies.

Accordingly, the main objects of the invention are: to produce a force to a supported body by the reactive force of stored energy against a body when freely suspended; to provide pulsations of reactive force to a supported body to produce serial urges thereto in a desired direction; to apply a multiplicity of reactive forces seriatim to a supported body to provide movement thereto in a selected direction; to store energy between two bodies which reacts therebetween upon the release of one body to move the other body in the direction opposite to that which the stored energy was applied to the released body, and in general, to provide a propulsion device which is simple in construction, positive in operation and economical of manufacture.

Other objects and features and novelty of the invention will be specifically pointed out or will become apparent when referred, for a better understanding of the invention, to the following description taken in conjunction with the accompanying drawings, wherein:

FIG. 4 is a view in elevation of a device illustrating another form which the invention may assume;

FIG. 5 is a sectional view of the invention illustrated in FIG. 4, taken on the line 5—5 thereof, and FIG. 6 is a view in elevation of a further form of device embodying features of the present invention.

Figure 1:
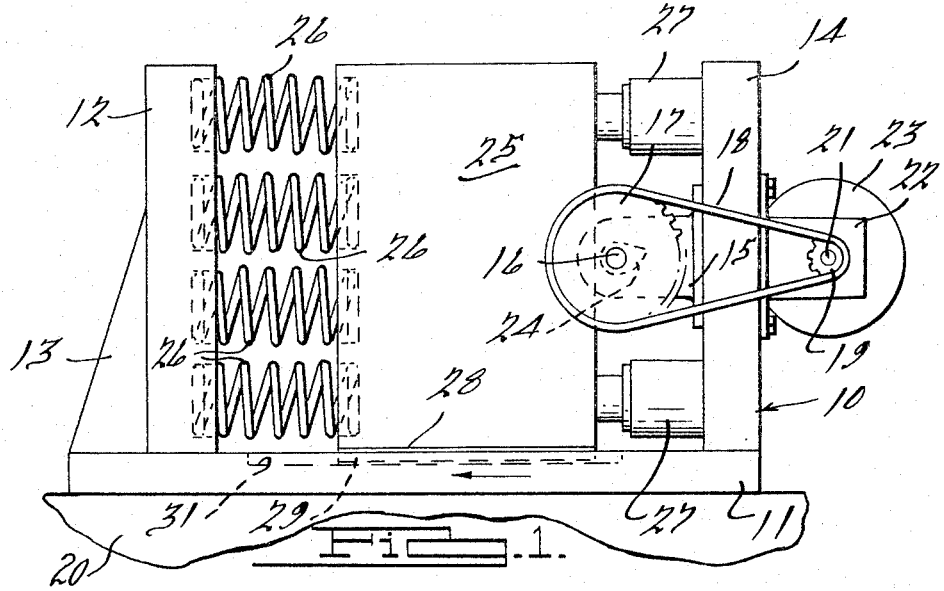
FIGURE 1 is a view in elevation of a propulsion device showing one form of the invention.
Figure 2:
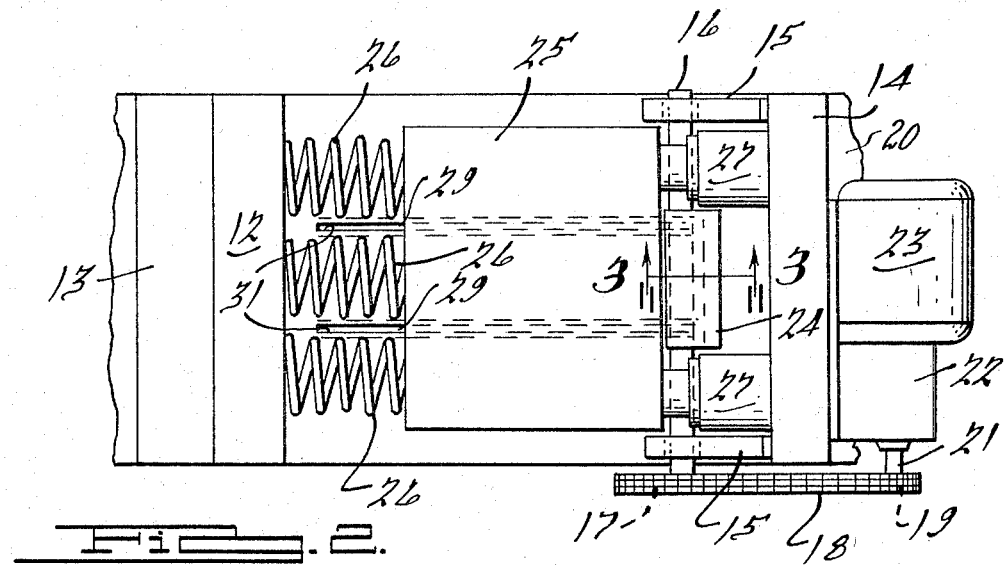
FIG. 2 is a plane view of the structure illustrated in FIG. 1.
Figure 3:
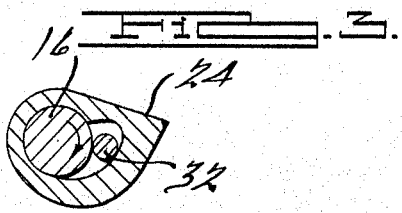
FIG. 3 is an enlarged broken sectional view of the structure illustrated in FIG. 2, taken along the line 3—3 thereof.

Referring to FIGS. 1 to 3, the propulsion device 10 has a base 11, and upright 12 at one end reinforced by a bracing member 13. The opposite end of the base 11 has an upright 14 disposed in alignment with the upright 12. Pillow blocks 15 support a shaft 16 having a sprocket 17 on one end connected by a chain 18 to a sprocket 19 on a shaft 21. The shaft 21 extends from a gear reduction unit 22 driven by a motor 23 supported on the upright 14. A cam 24 is connected by an overrunning clutch 32 to the shaft 16, as more clearly illustrated in FIG. 3. An inertia member 25, herein illustrated as a heavy metal block, is supported on the base 11 between the uprights 12 and 14. The inertia member is urged toward the upright 14 by a plurality of heavy springs 26 which are in compression. The inertia member abuts shock absorbs 27 supported on the corners of the uprights 14 in position to engage the adjacent corners of the inertia member. The inertia member may be supported on antifriction rollers, or the like, but is herein illustrated as being provided with a layer of Teflon cloth 28 which is procurable in the trade and which has Teflon threads on the outer side and threads on the inner side of bondable material which is adhered to the bottom surface of the inertia member. Guide elements 29 extend downwardly from the bottom of the inertia member into slots 31 in the base 11, the elements having the surfaces covered by the Teflon cloth 28 to eliminate any substantial friction between the inertia member and elements 29 and the material of the base 11.

When the motor 23 is energized, the shaft 16 is driven in a manner to lock the clutch 32 and drive the cam 24 which moves the inertia member 25 toward the upright 12 to further compress the springs 26. As the face of the cam passes over the engaged surface of the inertia member 25, energy will be stored in the springs 26 which urges the inertia member 25 toward the cam 24 which overrides and is released from the shaft when the springs are compressed so that the inertia member 25 becomes a free body without any interference by the cam. The springs 26 are now free to react between the inertia member 25 and the upright 12, and should the weight of the inertia member, for example, equal that of the uprights 12, 14, base 11 and the operating mechanism, then the reaction at both ends of the spring will be equal and tend to move the inertia member to the right and the upright 12 to the left to thereby impart motion to the enire device to the left. Most of the reactive movement in the inertia member 25 will be absorbed by the shock absorbers 27 and very little force tending to move the device to the right will result therefrom. The continuous operation of the motor will drive the shaft 16 and advance the cam 24 to move the inertia member 25 to the left to compress the springs 26 resulting in the overriding of the cam on the shaft, the freeing of the inertia member and the reaction to the stored energy in the spring 26 and the resulting impulse to the device. Continual impulses are applied to the upright 12 and the device is propelled in this manner so long as the motor 23 is driven. The device is self-contained and may be attached to any body 20 which is to receive the impulses for performing work independent of a reactive medium in the device which must otherwise be provided by the body.

In FIGS. 4 and 5, another form of the invention is illustrated to demonstrate the impulse reactive force when the stored energy is in tension. In this arrangement, a base 35 supports uprights 36 having a shaft 37 at the upper end which supports a pendulum arm 38 on the end of which an inertia member 39 is suspended. An end plate 41 is secured to the base 35 reinforced by gussets 42. A plurality of heavy springs 43 have the ends threaded into apertures 44 in the inertia member 39 and in caps 45 which are secured to the end plate 41 as by bolts 46. When the inertia member 39 is moved to the left, the springs are tensioned and when the inertia member is released, the energy stored in the springs tend to pull the inertia member and the end plate 41 toward each other, thereby imparting a force to the end plate 41 and base 35 to the left or toward the inertia member 39.

Energy absorbing mechanism 47 mounted on the end plate 41 embodies an outer cylinder 48 and inner cylinder 49. A piston 51 within the cylinder 49 has a rod 52 thereon containing a head 53 on the free end which is engageable with a boss 54 on the inertia member 39. A ring-shaped piston 55 is disposed between the cylinders 48 and 49, abutting against a heavy spring 56. At the end of the movement of the inertia member 39 to the right, the boss 54 strikes the head 53 and urges the piston 51 against the fluid within the cylinders 48 and 49 to apply pressure thereon and on the ring-shaped piston 55 which absorbs the energy through the compression of the spring 56. The pressure on the fluid being equal in all directions, is applied on the piston 55 and the spring 56 to produce a force to the left on the end plate 41 in the same direction as the reactive force that was produced by the tension in the springs 43 upon the freeing of the inertia member 39 after the inertia member had been moved to the left.

Any means may be provided for moving the inertia member 39 to the left, such as a ram 57 herein illustrated. The ram has a piston rod 58 which is connected to a block 59 which moves in a slot 61 in the base 35. The block 59 carries a pawl 62 which has an arm 63 urged against a stop 64 by a spring 65. The inertia member 39 has a plate 66 secured thereon in the path of movement of the end of the pawl 62. As the piston rod 48 is moved to the left, the pawl engages the plate 66 and moves the inertia member 39 to the left until the upward movement of the plate 66 frees it from the end of the pawl and releases the inertia member. This movement is small, as illustrated by the dot and dash line, but may be varied through the adjustment of the plate 66 upwardly and downwardly on the inertia member. After the plate 66 is released from the pawl 62, the end of the block 59 strikes the end of an arm 67 of a switch 68 which operates a four way valve 70 to reverse the flow of fluid in the ram 57 and return the rod 58 and block 59 to the right whereupon the block strikes the end of the arm 67 of a switch 69 which operates the valve to again reverse the flow of fluid in the ram 57 to advance the block 59 to the left and move the inertia member 39 to the left and tension the springs 43. The arrangement is such as to produce a fast return stroke to the rod 58 and a slow forward stroke thereof by the adjustment of by-pass valves within the fluid circuit in a manner well known in the art. The rod is continuously reciprocated in this manner and the reaction to the tension of the springs when the inertia member 39 is released, imparts movement to the left to the end plate 41 and base 35 for producing work. The tension of the springs 43 continuously reacts against inertia member 39 and the end plate 41 and the energy in the inertia member 39 at the end of its return movement is absorbed through the operation of the pistons 51 and 55 to expend the energy remaining in the inertia member 39 at the end of its movement to the right. The device is self-contained and may be attached to a body which is to receive the impulses for performing work independent of a reactive medium in the device which must be provided by the body.

In FIG. 6 a still further form of the invention is illustrated wherein the reactive force is obtained from the energy produced from an exploding gas. In this arrangement a base 71 supports an upright 72 at each side joined at the top by a shaft 73. The shaft supports a pendulum arm 74, on the end of which a heavy inertia member 75 is suspended. At the right hand end of the base 71 a cylinder block 76 is secured having cylinders 77 and 78 therein containing pistons 79 which are connected to the inertia member 75 by connecting rods 81. The cylinder block has a head 82 attached thereto containing exhaust passageways 83 and an intake passageway 84. Exhaust valves 85 control the exhaustion of the burnt gases and intake valves 86 control the admission of a fresh gas mixture to the cylinders. Spark plugs 87 are supported in the head 82 with the ends extending within the cylinder in the firing area thereof.

Pillow blocks 88 support a shaft 89 which is driven by a motor 91 at a desirable speed through suitable controls or through a gear box 92. The shaft drives exhaust cams 93 and intake cams 94 which operate the valves 85 and 86 in predetermined sequence to each other in each of the cylinders. The fuel in the cylinders may be fired simultaneously or in sequence. The shaft 89 also drives a magneto 95 and a distributor 96 which is connected thereto and to the spark plugs 87 to control the firing of the compressed gas within the cylinders. The gas is drawn in from a carburetor 97 by a blower or compressor 98 which produces a mixture under pressure in the intake passageway 94. As the motor 91 drives the shaft 89, a charge is introduced under pressure through the intake valve 86 of the cylinder 77 and after the closing of the valve, the spark plug fires the charge and a reactive impulse is applied to the cylinder block 76 and head 82 tending to urge the base 71 to the right. As the burnt gases are being exhausted in the cylinder 77 when the exhaust valve 85 is open by the return movement of the piston and heavy member 75, a charge has been admitted to and compressed by the associated piston 79 in the cylinder 78 which is fired to produce another reactive impulse to the base 71 to the right as the member 75 is urged to the left. As the burnt gas is exhausting from the cylinder 78 by the return movement of the weight member and piston, a new charge is being compressed and fired in the cylinder 77 to add another impulse to the base. This sequence is continued so long as the motor 91 is operating. Any number of the cylinders 77 and 78 may be employed in the cylinder block 76 to provide any number of impulses in a rapid manner to the device. The amount of force in each impulse may be controlled by changing the richness of the mixture of the gas and the degree of its compression. The force of the impulse can be increased by the simultaneous firing of the cylinders and the impulses can be varied by varying the speed of the motor 91 and employing a greater number of cylinders which are fired in sequence. The device is entirely self contained and produces a force in the base 71 to urge it to the right away from the inertia member. The device of FIG. 6 functions in the same manner as the two devices above described, employing a free body against which a force reacts to produce work without the use of any substantial contact medium such as the ground.

The embodiments of the invention herein illustrated are given by way of example, as it will be apparent to those skilled in the art that various other arrangements may be employed to produce a reaction on a body from a free body when energy is released therebetween. It is to be understood that any number of inertia members may be employed in a device to operate seriatim to produce repeated impulses one upon another to constantly urge the device in a direction in which the released energy is applied. Such repeated impulses are obtained when employing a single inertia member and a plurality of pistons and cylinders as illustrated in FIG. 6. The device may be mounted so that it can be turned in any direction to conform to the direction in which the impulses are to be applied.

In the examples illustrated in FIGS. 1 to 5, the inertia member is moved slowly to stress the springs so that only an insignificant amount of reactive energy is required. The stored energy in the stressed springs is instantly released when the inertia member is freed to act thereon and on the body to apply a rapid acceleration to the inertia member and a sharp impulse of short duration to the body in a predetermined direction.

What is claimed is:

1. In a reaction impulse device, a base, a heavy inertia member on said base mounted for movement toward one and the other end thereof, actuating means disposed between said inertia member and base, means for slowly advancing said inertia member to a cocked position to stress said actuating means relative to said inertia member and base, means for releasing said inertia member from said cocked position to permit said actuating means to react thereon and apply a power impulse to said base, and a body to which the base is rigidly secured, said body providing a reactive force to said cocking movement.

2. In a reaction impulse device as recited in claim 1 wherein the heavy inertia member is supported on a pendulum arm and the actuating means is a plurality of springs, means for advancing the inertia member and pendulum arm to stress said springs against the reactive resistance of the body, and means for releasing said inertia member to permit the springs to react thereagainst for applying an impulse to the device and body.

3. In a reaction impulse device as recited in claim 1 wherein energy absorbing means is positioned in the path of movement of said released inertia member.

4. In a reaction impulse device as recited in claim 3 wherein said energy absorbing means applies an urge to the base in the direction the power impulse was applied thereto.

References Cited by the Examiner
UNITED STATES PATENTS

| | | | |
|---|---|---|---|
| 113,417 | 4/1871 | Gilbert | 60—7 |
| 1,743,978 | 1/1930 | Quisling | 60—7 X |
| 2,636,340 | 4/1953 | Llamozas | 60—7 |

OTHER REFERENCES

Ganot's Physics, Atkinson and Reinhold; 18th edition; Sec. 42, pp. 27–28; Section 69, pp. 57–58; Pub. Longmans, Green and Co. Paternoster Row; London, England.

Analytical Experimental Physics, Lemon and Ference; pp. 33, 48–51, 61–62, 89–93; publisher The University of Chicago Press; Chicago, Illinois.

EDGAR W. GEOGHEGAN, *Primary Examiner.*